A. GOWDER.
SMOKE PURIFIER AND DUST COLLECTOR.
APPLICATION FILED JAN. 19, 1911.
1,024,326. Patented Apr. 23, 1912.
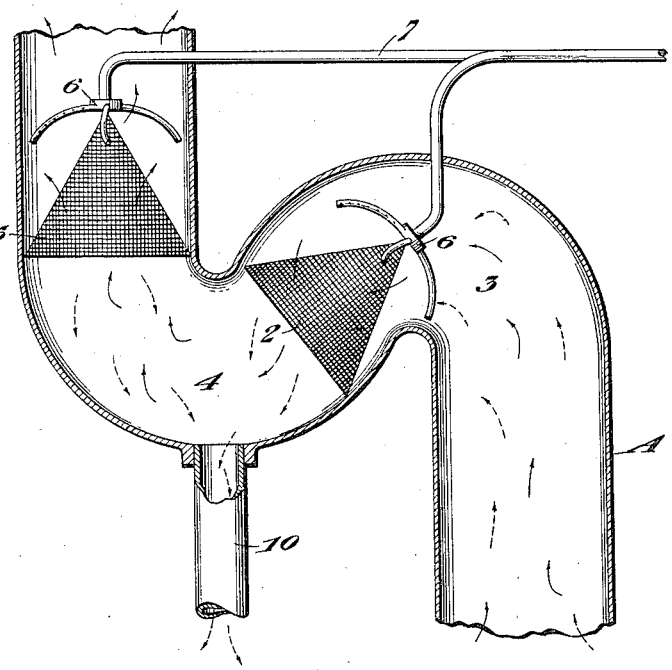
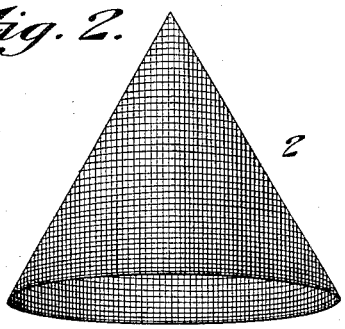
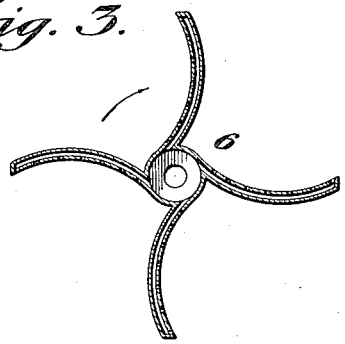

UNITED STATES PATENT OFFICE.

ARTHUR GOWDER, OF RIVERSIDE, CALIFORNIA.

SMOKE-PURIFIER AND DUST-COLLECTOR.

1,024,326.  Specification of Letters Patent.  Patented Apr. 23, 1912.

Application filed January 19, 1911. Serial No. 603,464.

*To all whom it may concern:*

Be it known that I, ARTHUR GOWDER, a citizen of the United States, residing at Riverside, in the county of Riverside and State of California, have invented certain new and useful Improvements in Smoke-Purifiers and Dust-Collectors, of which the following is a specification.

My invention relates to an improvement in smoke purifiers and dust collectors, and the object is to provide means whereby the smoke or dust passing through the smoke pipe will pass through a spray of water and then into a pocket where the heavy particles will pass off from the pipe and be prevented from passing off through the top of the smoke stack.

The invention consists in certain novel features of construction and combinations of parts which will be hereinafter fully described and pointed out in the claim.

In the accompanying drawings: Figure 1 is a vertical sectional view of the invention as applied to a smoke pipe; Fig. 2 is a perspective view of one of the cone-shaped screens; and Fig. 3 is a detail sectional view of the rotary spraying head.

A represents a smoke pipe which is provided with an S-shaped bend forming a trap. At the first bend in the pipe a cone-shaped screen 2 is mounted with its apex extending upwardly, so that as the smoke passes up through the pipe and begins to pass around the bend 3, it will come in contact with the outer surface of the cone-shaped screen 2 and the particles passing through the screen will drop into the pocket 4. Another cone-shaped screen 5 is mounted at the upper terminus of the bend and has its apex extending upwardly into the vertical rise of the smoke stack, so that the particles carried by the smoke or the dust will pass into the cone-shaped screen 5 and come in contact with its inner surface. A rotary spray 6 is located at the apex of each cone These sprays are connected to pipes 7 which are connected to any suitable source of water supply. Water is admitted to the sprays, causing them to revolve, and the water to be thrown against the walls of the stack and around the cone surface of the screens. Therefore the particles carried by the smoke or cement dust which passes up through the pipe, will first come in contact with the spray of water from the spray 6 which is located at the apex of the screen 2. The smoke will thereby be purified to a certain extent, and the particles will be carried through the screen by the flow of the water, so that the particles will fall to the bottom of the pocket 4. Any particles which do not fall by the contact from the first sprayer 6, will pass up into the inner surface of the cone screen 5, and will come in contact with the sprayer 6 located at the apex of the screen 5, which will cause the particles to be forced back into the pocket 4, from which they are conducted with the water by means of a pipe 10 which is connected to the base of the pocket 4. The screen 2 forms a means whereby the particles can be broken up by the contact of the water, and the screen 5 will tend to prevent the particles or dust from passing up through the pipe or stack, the screens thereby assisting in catching the particles which might be too heavy and which would naturally under such conditions pass through the water spray.

From the foregoing, it will be seen that I have provided means for collecting dust or particles carried by the smoke from passing through the smoke stack. In cement factories the dust which passes from the stack causes damage to the surrounding trees, and it is the object of my invention to overcome this objection.

Having fully described my invention, what I claim as new and desire to secure by Letters Patent, is:

In a smoke purifier and dust collector, the combination with a stack having an S-shaped bend therein forming a pocket, of a screen cone located within the stack and in the bend, a second screen received in the stack beyond the bend, said first named screen placed to receive the smoke upon its outer surface and said second screen adapted to receive the smoke upon its inner surface, rotary sprays located at the apexes of the screens, and a water outlet formed in the pocket.

In testimony whereof I affix my signature, in the presence of two witnesses.

ARTHUR GOWDER.

Witnesses:
 F. GOWDER,
 M. ESTNDILLO.

Copies of this patent may be obtained for five cents each, by addressing the "Commissioner of Patents, Washington, D. C."